(12) United States Patent
Baudat

(10) Patent No.: US 7,073,652 B2
(45) Date of Patent: Jul. 11, 2006

(54) CLASSIFICATION METHOD AND APPARATUS

(75) Inventor: Gaston Baudat, Geneva (CH)

(73) Assignee: Mars Incorporated, McLean, VA (US)

( * ) Notice: Subject to any disclaimer, the term of this patent is extended or adjusted under 35 U.S.C. 154(b) by 71 days.

(21) Appl. No.: 10/444,392

(22) Filed: May 23, 2003

(65) Prior Publication Data

US 2003/0192765 A1 Oct. 16, 2003

Related U.S. Application Data

(63) Continuation of application No. 09/857,009, filed as application No. PCT/IB99/02012 on Dec. 1, 1999, now Pat. No. 6,588,571.

(30) Foreign Application Priority Data

Dec. 2, 1998 (GB) .......................................... 9826494

(51) Int. Cl.
*G07D 7/00* (2006.01)

(52) U.S. Cl. ..................................................... 194/302
(58) Field of Classification Search ................ 194/302, 194/328, 205, 206; 382/135, 136, 137, 155, 382/156, 159, 160, 181, 224, 225
See application file for complete search history.

(56) References Cited

U.S. PATENT DOCUMENTS

| | | | | |
|---|---|---|---|---|
| 4,386,432 A | | 5/1983 | Nakamura et al. ............. | 382/7 |
| 5,187,751 A | * | 2/1993 | Tanaka ......................... | 382/225 |
| 5,503,262 A | | 4/1996 | Baudat et al. ............... | 194/206 |
| 5,522,491 A | | 6/1996 | Baudat et al. ............... | 194/207 |
| 5,947,255 A | | 9/1999 | Shimada et al. ............ | 194/207 |
| 6,058,205 A | * | 5/2000 | Bahl et al. ................... | 382/159 |
| 6,134,344 A | * | 10/2000 | Burges ........................ | 382/155 |
| 6,226,408 B1 | | 5/2001 | Sirosh ......................... | 382/224 |
| 2002/0117375 A1 | | 8/2002 | Baudat et al. ............... | 194/302 |

FOREIGN PATENT DOCUMENTS

| | | |
|---|---|---|
| EP | 0 367 921 A2 | 5/1990 |
| EP | 0 887 761 A2 | 12/1998 |

OTHER PUBLICATIONS

Burges, C.J.C., "A tutorial on support vector machines for pattern recognition", Data Mining and Knowledge Discovery, vol. 2, No. 2, 1998, pp. 121–167.
Burges, C.J.C., "Simplified support vector decision rules", Machine Learning. Proceedings of the International Conference, Jul. 3, 1996, pp. 71–77.
Bishop, C.M., "Neural Networks for Pattern Recognition", pp. 105–112.
Scholkopf et al., "Nonlinear Component Analysis as a Kernel Eigenvalue Problem," Neural Computatin 10: 1299–1319, 1998.
Fukunaga, K., "Feature Extraction and Linear Mapping for Classification," In *Introduction to Statistical Pattern Recognition* 2nd Edition, Academic Press: San Diego, CA pp. 445–455, 1990.
Tanaka et al., "Recognition of Paper Currencies by Hybrid Neural Network," Neural Networks Proceedings, 1998. IEEE World Congress on Computational Intelligence. The 1998 IEEE Int'l Joint Conference in Anchorage, AK, USA, May 4–9 1998, New York, NY, USA, IEEE, vol. 3,4 May 1998, pages 1748–1753, XP012867775.
Lantis et al., "Indexing Byzantine Cypriot, Using Image Analysis," Digital Signal Processing proceedings, 1997. DSP 97., 1997 13$^{th}$ Int'l Conference on Santorini, Greece Jul. 2–4 1997, New York, NY, USA, IEEE, US, vol. 2, Jul. 1997, pages 1153–1156, XP010251236.

* cited by examiner

*Primary Examiner*—Donald P. Walsh
*Assistant Examiner*—Mark J. Beauchaine
(74) *Attorney, Agent, or Firm*—Fish & Richardson P.C.

(57) ABSTRACT

Processing data derived from currency items includes measuring samples of currency items of classes to produce feature vectors in a first space and mapping the feature vectors to a second space in which there is a clearer separation of the classes.

10 Claims, 2 Drawing Sheets

CLASSIFICATION METHOD AND APPARATUS

Figure 1:
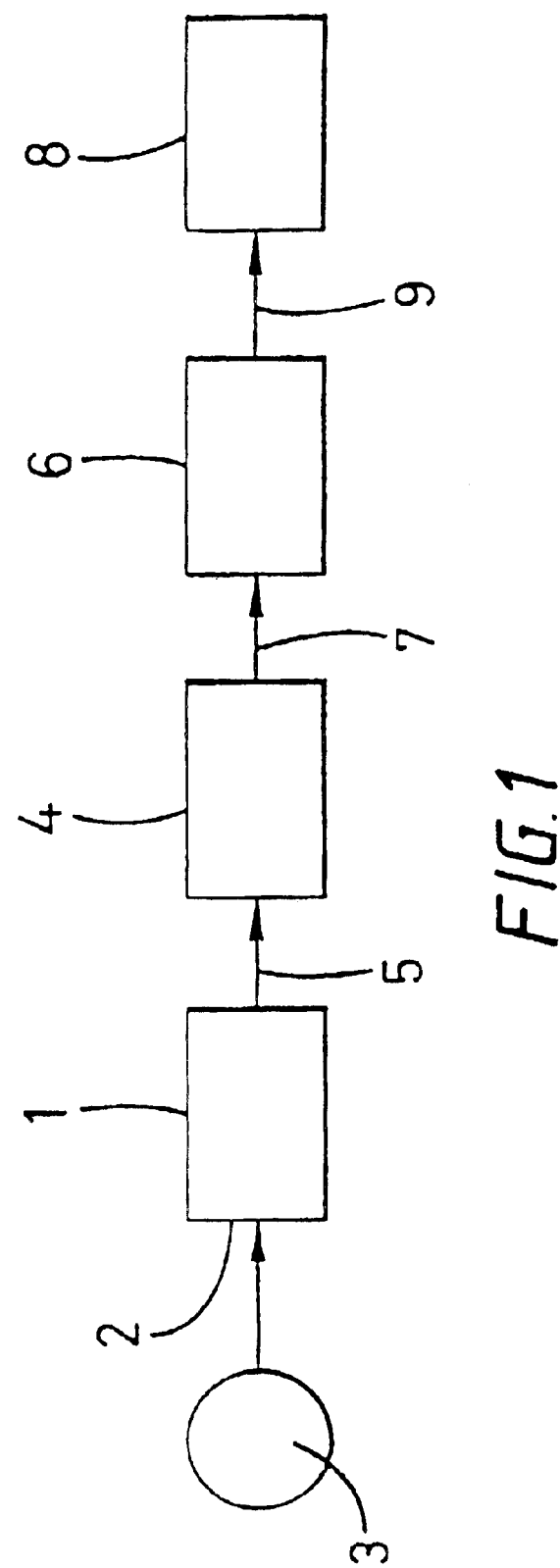

This application is a continuation of U.S. Ser. No. 09/857,009, filed Aug. 30, 2001 now U.S. Pat. No. 6,588,571, which is based on PCT/IB99/02012, filed Dec. 1, 1999.

The invention relates to a method and apparatus for classifying items. The invention is concerned especially with the classification of coins or banknotes.

Coins and banknotes inserted into mechanisms, such as vending machines, change machines and the like, are classified, on the one hand according to value, and/or on the other hand, between originals and copies or counterfeits thereof. Various methods of performing such classifications are known. As one example, described in GB 2 238 152 A, the contents of which are incorporated herein by reference. For example, measurements are taken from an inserted coin which represent different features of the coin, such as material and the thickness. Those measurements are then compared with respective stored pairs of values, each set of pair of values corresponding to a respective acceptable denomination of coin. When each measured value falls within the respective range for a given denomination, the inserted coin is classified as belonging to that denomination.

In the type of classification discussed above, the measured values can be regarded as elements in a feature vector, and the acceptable measurements for different denominations correspond to regions in feature space, known as acceptance regions. In the example given above, the feature space is two-dimensional, and acceptance regions are rectangles, but the feature space can have any number of dimensions, with corresponding complexity in the acceptance regions. For example, GB 2 254 949 A, the contents of which are incorporated herein by reference, describes ellipsoidal acceptance regions in three-dimensional feature space.

Other examples of methods and apparatus for classifying bills and coins are described in EP 0 067 898 A, EP 0 472 192 A, EP 0 165 734 A. Other methods of classification include the use of neural networks, as described, for example, in EP 0 553 402 A and EP 0 671 040 A, the contents of which are also incorporated herein by reference.

A significant problem in the classification of coins is the difficulty of separating different denominations. The population distributions of the different denominations of interest may be such that it is not possible easily to define appropriate acceptance boundaries with which adequately separate the denominations. Another problem is that in order to achieve adequate separation, it may be necessary to consider feature vectors having a large number of elements, which makes it more difficult to understand the various distributions and thus more difficult to obtain suitable acceptance boundaries. These problems are akin to general classification problems in data analysis which has been studied and have led to various different techniques including statistical methods.

As an example of a statistical method of data analysis, principal component analysis ("PCA"), is a method whereby data expressed in one space is transformed using a linear transformation into a new space, where most of the variation within the data can be explained using fewer dimensions than in the first space. The method of PCA involves finding the eigenvectors and eigenvalues of the covariance matrix of the variables. The eigenvectors are the axes in the new space, with the eigenvector having the highest eigenvalue being the first "principal component" and so on in decreasing size. Details of PCA can be found in textbooks on multivariate analysis, such as "Introduction to Multivariate Analysis" by Chatfield and Collins, see Chapter 4.

Another method of data analysis for classification purposes is linear discriminant analysis ("LDA"). LDA is useful when it is known that the data falls into separate groups. LDA aims to transform the data into a new space so as to maximize the distance between the centre of each group of data as projected onto axes in the new space and also to minimize the variance of each group along the axes. Methods for doing this are described in, for example, "Introduction to Statistical Pattern Recognition" by Fukunaga ("Fukunaga"). In one example, the maximisation is performed by finding a linear transformation which maximises the value of the trace of $C^{-1}V$ where V is the inter-class covariance matrix and C is the covariance matrix of all samples. As explained in Fukunaga, this amounts to finding the eigenvectors and eigenvalues of $C^{-1}V$. The eigenvectors are the axes of the new space. As described in the paper, when there are N classes, the new space has N-1 dimensions.

In many situations, neither PCA nor LDA will give adequate separation of the groups of data. A further method of data analysis is non-linear component analysis (NCA), which is based on PCA. In NCA, the data is projected into a new space using a non-linear mapping, and then PCA is performed in the new space. Details of NCA are given in the article "Nonlinear component Analysis as a Kernel Eigenvalue Problem" by Bernhard Scholkopf, Alexander Smola and Klaus-Robert Muller, Neural Computation 10, 1299–1319 (1998). ("Scholkopf".)

A problem with NCA is that the dimension of the non-linear space may be very large, and so the number of principal components is also very large. For a given problem, it is not known how many principal components are needed for a good classification.

Generally, the invention relates to a method of deriving a classification for classifying items of currency comprising measuring known samples for each class and deriving features vectors from the measured samples, mapping the feature vectors to a second space in which there is a clearer separation of the different classes and deriving a separating function using the separation in the second space.

More specifically, the present invention provides a method of deriving a classifier for classifying items of currency into two or more classes comprising measuring known samples for each class and deriving feature vectors from the measured samples, selecting a function corresponding to a mapping of the feature vector space to a second space, mapping feature vectors to image vectors, and deriving coefficients representing N-1 axes, where N is the number of classes, in the second space, obtaining values representing the projections of the image vectors for the measured samples onto the N-1 axes, and using those values to derive a separating function for separating the classes equivalent to a separating function in the second space.

The invention also provides a method for classifying an item of currency comprising measuring features of the item, generating a feature vector from the measured values, and classifying the item using a classifying derived.

The invention also provides an apparatus for classifying items of currency comprising measuring means for measuring features of an item of currency, feature vector generating means for generating a feature vector from the measured values, and classifying means for classifying the item using a classifier.

The invention also provides an apparatus for classifying items of currency comprising measuring means for measuring features of an item of currency, feature vector generating means for generating a feature vector from the measured values, and classifying means for classifying the item using a function corresponding to a non-linear mapping of the feature vector space to a second higher-dimensional space, mapping feature vectors to image vectors, and coefficients representative of N-1 axes, where N is the number of classes that can be classified by the apparatus, in the second space, and a function equivalent to a separating function in the second space.

Figure 2:
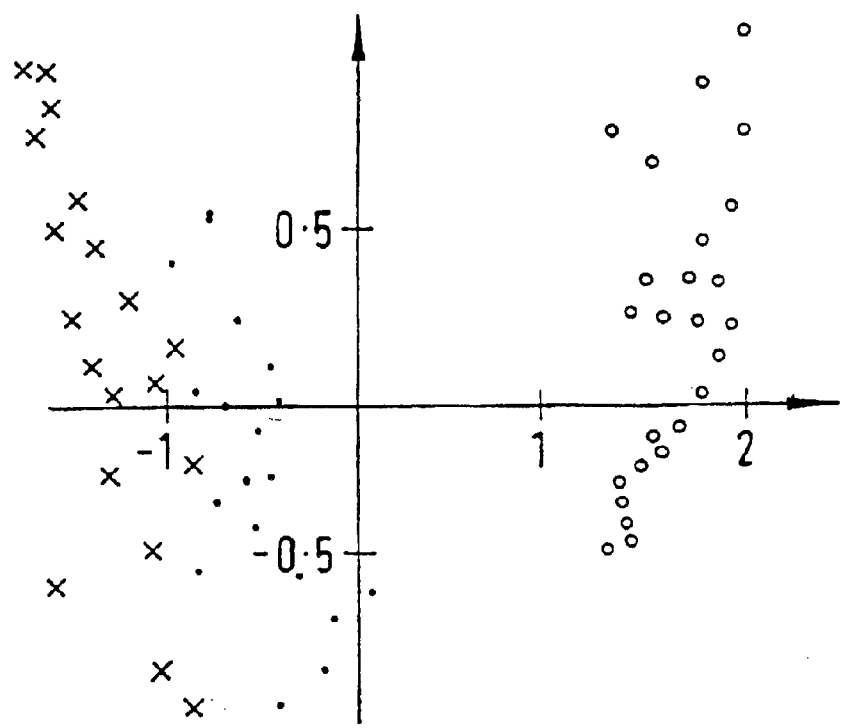
Figure 3:
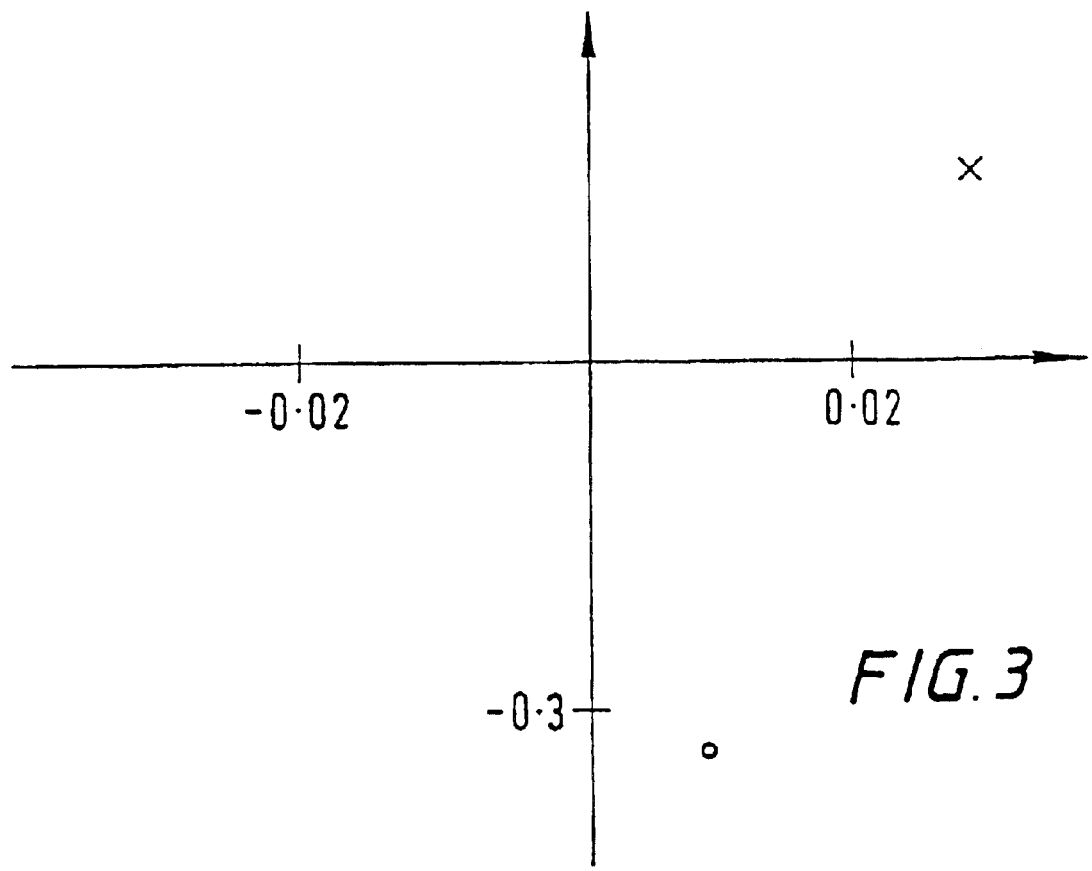

An embodiment of the invention will be described with reference to the accompanying drawings of which:

FIG. 1 is a block diagram of a classification system.
FIG. 2 is a graph showing a distribution of coin data; and
FIG. 3 is a graph showing a projection of the data of FIG. 2 onto new axes.

The invention will be described with reference to a coin validator.

In FIG. 1, box 1 designates a measuring system which includes an inlet 2, a transport system in a form of a coin inlet and coin transport path (not shown) for presenting a sample 3 and a sensor system (not shown) for measuring physical quantities of the sample. The measuring system 1 is connected to a processing system 4 by means of a data bus 5. Processing system 4 is connected to a classifier 6 by means of a data bus 7. The output of the classifier 6 is connected to a utilization system 8 by means of a data output bus 9. The utilization system 8 is in this example a vending machine, but may also be, for example, a money exchange machine.

The measuring system 1 measures features of an inserted coin 3. The measured features are assembled into a feature vector having n elements where each element corresponds to a measured feature by the processing system 4. In the present example, the sensor system measures values representative of the material, thickness and diameter of an inserted coin, using known techniques (see, for example, GB 2 254 949 A) and those values are the three elements of the corresponding feature vector. Briefly, each sensor comprises one or more coils in a self-oscillating circuit. In the case of the diameter and thickness sensors, a change in the inductance of each coil caused by the proximity of an inserted coin causes the frequency of the oscillator to alter, whereby a digital representation of the respective property of the coin can be derived. In the case of the conductivity sensor, a change in the Q-factor of the coil caused by the proximity of an inserted coin causes the voltage across the coil to alter, whereby a digital output representative of conductivity of the coin may be derived. Although the structure, positioning and orientation of each coil, and the frequency of the voltage applied thereto, are so arranged that the coil provides an output predominantly dependent upon a particular one of the properties of conductivity, diameter and thickness, it will be appreciated that each measurement will be affected to some extent by other coin properties.

Of course, many different features representative of items of currency can be measured and used as the elements of the feature vectors. For example, in the case of a banknote, the measured features can include, for example, the width of the note, the length of the note, and the intensity of reflected or transmitted light for the whole or part of the note. As an example, a measuring system can be arranged to scan a banknote along N lines using optical sensors. Each scan line contains L individual areas, which are scanned in succession. In each area, there are measurements of M different features. More specifically, for each area, measurements are made of the reflectance intensities of red, green and infra-red radiation. The total number of measurements for a banknote is therefore L×M×N. These measurements form the components of a feature vector for the respective specimen, so that the feature vector has L×M×N components. Alternatively, the measurements can be processed in a different way to obtain a feature vector representative of the measured specimen. For example, local feature vectors for each measured area can be formed made up of the M measurements for that area, so that each local feature vector has M components. The local feature vectors can then be summed over the area of the banknote to obtain an M dimensional feature vector representative of the entire specimen.

The feature vector is then input to the classifier 6. The classifier 6 determines whether the sample belongs to any one of predetermined classes, using the feature vector and predetermined classification criteria including a separating function. If the sample is identified as belonging to an acceptable denomination of banknote, then it is accepted and the corresponding value of the note is credited. If the sample is identified as belonging to a known counterfeit group, it is rejected.

In this example, the system is for classifying two denominations of coins and one known counterfeit. A two-dimensional representation of the distribution in measurement space is shown in FIG. 2. The crosses represent samples of the first denomination, the dots represent counterfeits of the first denomination and the circles represent samples of the second denomination.

The derivation of the separating function will be described below in general terms. The method of classification will then be described, also in general terms, followed by an explanation of the application of the general method to the specific example.

Briefly, a method for deriving a separating function according to an embodiment of the invention maps the input space, that is the space of the measured feature vectors, using a non-linear map, into a higher dimensional space with linear properties. Separating hyperplanes are constructed in the mapped space using training data, using the equivalent of an LDA analysis in the mapped space.

The population distribution of the denominations are analysed as discussed below.

Initially, samples of each of the denominations of interest and each of the known counterfeit are measured and corresponding feature vectors are formed. The feature vectors from the samples, when plotted, for example, on a n-dimensional scatter graph, (where n is the number of measured features) fall roughly into groups, known as clusters. These measured samples are then used to derive a separating function, as described below. In this example, 50 samples for each denomination and 50 samples of the counterfeit, are used.

Before proceeding further, a general explanation of the notation used is provided.

The input space, that is, the space of feature vectors, is defined as X.

$$X = \bigcup_{l=1}^{N} X_l,$$

where N is the number of clusters. The cardinality of subspace $X_1$ is denoted by $n_1$, and the number of elements in X is M. Thus $$\sum_{l=1}^{N} n_l = M.$$

$x^t$ is the transpose of vector x.

In the input space, C is the covariance matrix, and $$C = \frac{1}{M}\sum_{j=1}^{M} x_j x_j^t \qquad (1)$$

The method of the invention uses a kernel function k defining a dot product in a mapped space. Suppose $\phi$ is a non-linear function mapping X into a Hilbert space F.

$\phi: X \rightarrow F$ $x \rightarrow \phi(x)$ (2)

and $k(x,y) = \phi(x) \cdot \phi(y) = \phi^t(x)\phi(y)$

As will be clear from the following discussion, it is not necessary explicitly to construct $\phi$ for a given k, although it can be shown, by Mercer's theorem, if for any k is a continuous kernel of a positive integral operator which is positive, then a $\phi$ exists (see Schölkopf Section 3 and Appendix C). Nor is it necessary to perform dot products explicitly in F, which may be an infinite dimensional space.

In F, V is the covariance matrix, and $$V = \frac{1}{M}\sum_{j=1}^{M} \phi(x_j)\phi^t(x_j) \qquad (3)$$

We assume that the observations are centred in F, that is, that $$\sum_{j=1}^{M} \phi(x_j) = 0.$$

A method of centering data will be described later.
B is the covariance matrix of the cluster centres, and $$B = \frac{1}{M}\sum_{l=1}^{N} n_l \overline{\phi_l}\,\overline{\phi_l'} \qquad (4)$$

where $\overline{\phi_l}$ is the mean value of the cluster l, that is $$\overline{\phi_l} = \frac{1}{n_l}\sum_{k=1}^{n_l} \phi(x_\alpha) \qquad (5)$$

where $x_{lj}$ is the element j of the cluster l.
B represents the inter-cluster inertia in F.
V can also be expressed using the clusters as $$V = \frac{1}{M}\sum_{l=1}^{N}\sum_{k=1}^{n_l} \phi(x_{lk})\phi^t(x_{ln}) \qquad (6)$$

V represents total inertia in F.

Let $k_{ij} = k(x_i, x_j)$ and $(k_{ij})_{pq} = (\phi^t(x_{pi})\phi(x_{qj}))$

Let K be an (M×M) matrix defined on the cluster elements by $(K_{pq})_{\substack{p=1 \ldots N \\ q=1 \ldots N}}$ where $(K_{pq})$ is the covariance matrix between $cluster_p$ and $cluster_q$.

$$K = (K_{pq})_{\substack{p=1\ldots N \\ q=1\ldots N}} \text{ where } K_{pq} = (k_{ij})_{\substack{i \ldots n_p \\ j \ldots n_q}} \qquad (8)$$

$K_{pq}$ is a $(n_p \times n_q)$ matrix
and K is symmetric so that $K_{pq}^t = K_{pq}$ W is the matrix centre, and $W = (W_l)_{l=1 \ldots N}$ (9)

where $W_l$ is a $(n_l \times n_l)$ matrix with all terms equal to $\frac{1}{n_l}$.

W is a M×M block diagonal matrix.

The method essentially performs linear discriminant analysis in the mapped space F to maximise inter-cluster inertia and minimise the intra-cluster inertia. This is equivalent to eigenvalue resolution, as shown in Fukunaga. A suitable separating function can then be derived.

More specifically, the method involves finding the eigenvalues $\lambda$ and eigenvectors v that satisfy $\lambda Vv = Bv$ (10)

The eigenvectors are linear combinations of elements of F and so there exist coefficients $\alpha_{pq}$ (p=1 . . . N, q=1 . . . $n_p$) such that $$v = \sum_{p=1}^{N}\sum_{q=1}^{n_p} \alpha_{pq}\phi(x_{pq}) \qquad (11)$$

The eigenvectors of equation (10) are the same as the eigenvectors of $\lambda\phi^t(x_{ij})Vv = \phi^t(x_{ij})Bv$ (12)

(see Schölkopf).
Using the definitions of K and W, and equations (6) and (11), the left-hand side of (12) can be expressed as follows:

$$Vv = \frac{1}{M}\sum_{l=1}^{N}\sum_{k=1}^{n_l}\phi(x_{lk})\phi^t(x_{lk})\sum_{p=1}^{N}\sum_{q=1}^{n_p}\alpha_{pq}\phi(x_{pq})$$

$$= \frac{1}{M}\sum_{p=1}^{N}\sum_{q=1}^{n_p}\alpha_{pq}\sum_{l=1}^{N}\sum_{k=1}^{n_l}\phi(x_{lk})\left[\phi^t(x_{lk})\phi(x_{pq})\right]$$

and

-continued $$\lambda \phi'(x_{ij})Vv = \frac{\lambda}{M} \sum_{p=1}^{N} \sum_{q=1}^{n_p} \alpha_{pq} \phi'(x_{ij}) \sum_{l=1}^{N} \sum_{k=1}^{n_j} \phi(x_{lk}) [\phi'(x_{lk}) \phi(x_{pq})]$$

$$= \frac{\lambda}{M} \sum_{p=1}^{N} \sum_{q=1}^{n_p} \alpha_{pq} \sum_{l=1}^{N} \sum_{k=1}^{n_j} [\phi'(x_{ij})\phi(x_{lk})][\phi'(x_{lk}) \phi(x_{pq})]$$

Using this formulate for all clusters i and for all elements j we obtain:

$$\lambda(\phi'(x_{11}), \ldots, \phi'(x_{1n_q}), \ldots, \phi'(x_{ij}), \ldots, \phi'(x_{N1}), \ldots, \phi'(x_{Nn_S}))Vv = \frac{\lambda}{M} KK\alpha$$

where $$\alpha = (\alpha_{pq})_{\substack{p=1\ldots N \\ q=1\ldots n_p}}$$

$$= (\alpha_p)_{p=1\ldots N}$$

where $\alpha_p = (\alpha_{pq})q=1\ldots n_p$

Using equations (4), (5) and (11), for the right term of (14):

$$Bv = \frac{1}{M} \sum_{p=1}^{N} \sum_{q=1}^{n_p} \alpha_{pq} \phi(x_{pq}) \sum_{l=1}^{N} n_l \left[\frac{1}{n_l}\sum_{k=1}^{n_l} \phi(x_{lk})\right]\left[\frac{1}{n_l}\sum_{k=1}^{n_l} \phi(x_{lk})\right]'$$

$$= \frac{1}{M} \sum_{p=1}^{N} \sum_{q=1}^{n_p} \alpha_{pq} \sum_{l=1}^{N} \left[\sum_{k=1}^{n_l} \phi(x_{lk})\right]\left[\frac{1}{n_l}\sum_{k=1}^{n_l} \phi'(x_{lk}) \phi(x_{pq})\right]$$

and $$\phi'(x_{ij})Bv = \frac{1}{M} \sum_{p=1}^{N} \sum_{q=1}^{n_p} \alpha_{pq} \sum_{l=1}^{N} \left[\sum_{k=1}^{n_l} \phi'(x_{ij})\phi(x_{lk})\right]\left[\frac{1}{n_l}\sum_{k=1}^{n_l} \phi'(x_{lk}) \phi(x_{pq})\right]$$

For all clusters i and for all elements j we obtain:

$$(\phi'(x_{11}), \ldots, \phi'(x_{1n_j}), \ldots, \phi'(x_{ij}), \ldots, \phi'(x_{N1}), \ldots, \phi'(x_{Nn_S}))Bv = \frac{1}{M}KWK\alpha \quad (14)$$

Combining (13) and (14) we obtain:
$\lambda KK\alpha = KWK\alpha$
Thus, $$\lambda = \frac{\alpha' KWK\alpha}{\alpha' KK\alpha} \quad (15)$$

K can be decomposed as K=QR (Wilkinson, 1971) so that $K\alpha = QR\alpha$.
R is upper triangular and Q is orthonormal, that is $Q'Q=I$.
Q is a M×r matrix and R is a r×M matrix, where r is the rank of K. It is known that the QR decomposition always exists for a general rectangular matrix.

Then, let $R\alpha=\beta$ (16)

As the rows of R are linearly independent, for a given β, there exists at least one α solution.
Hence $K\alpha=Q\beta$ and $\alpha'K=\beta'Q'$ (K is symmetric).

Substituting in (15)

$$\lambda = \frac{\alpha' KWK\alpha}{\alpha' KK\alpha} \quad (17)$$

Q is orthonormal so $\lambda\beta=Q'WQ\beta$ (18)

Equation (18) is in the form of a standard eigenvector equation. As K is singular, the QR decomposition permits work on a subspace Qβ, which simplifies the resolution.

Then the coefficients α can be derived from β from equation (16), and then the eigenvectors from equation (11).

These coefficients α are normalised by requiring that the corresponding vectors v in F be normalised. That is:

$$v'v=1 \quad (19)$$

or (from equation 11)

$$V'V = \sum_{p=1}^{N} \sum_{q=1}^{n_p} \sum_{l=1}^{N} \sum_{h=1}^{n_l} \alpha_{pq}\alpha_{lh}\phi'(x_{pq})\phi(x_{lh}) = 1 \quad (20)$$

$$= \sum_{p=1}^{N} \sum_{l=1}^{N} \alpha'_p K_{pl} \alpha_l = 1$$

$$= \alpha' K\alpha$$

so (19) $\Rightarrow \alpha' K\alpha = 1$

The steps given above set out how to find the eigenvectors v of equation (10).

As its known from linear discriminant analysis (see, for example, Fukunaga), the number of eigenvectors=N−1 where N is the number of clusters. The image of the clusters in the subspace spanned by the eigenvectors is found by projecting onto the eigenvectors. This is done using the following equation:

for an eigenvector v, and a feature vector x.

$$(\phi'(x)v) = \sum_{p=1}^{N} \sum_{q=1}^{n_p} \alpha_{pq}\phi'(x_{pq})\phi(x) \quad (21)$$

$$= \sum_{p=1}^{N} \sum_{q=1}^{n_p} \alpha_{pq}k(x_{pq},x)$$

As can be seen from the above, the calculation does not require knowledge of φ, or the need to calculate a dot product in F.

It has been shown in experiments that by use of a suitable kernel function, the images of the clusters in the eigenvector subspace are well-separated and, more specifically, may be linearly separable, that is they can be separated by lines, planes or hyperplanes.

Then a suitable separating function can easily be derived for classifying measured articles, using a known technique, such as inspection, averaging, Malalanobis distance, comparison with k nearest neighbours.

As mentioned previously, it was assumed that the observations are centred in F. Centering will now be discussed in more detail. Firstly, for a given observation $x_{ij}$: element j of the cluster i, the image $\phi(x_{ij})$ is centered according to:

$$\tilde{\phi}(x_{ij}) = \phi(x_{ij}) - \frac{1}{M}\sum_{l=1}^{N}\sum_{k=1}^{n_l}\phi(x_{lk}) \quad (22)$$

We have then to define the covariance matrix K with centered points:
$(\tilde{k}_{ij})_{pq} = (\tilde{\phi}(x_{pi}) \cdot \tilde{\phi}(x_{qj}))$ for a given cluster p and q.

$$(\tilde{k}_{ij})_{pq} = \left[\phi(x_{pi}) - \frac{1}{M}\sum_{l=1}^{N}\sum_{k=1}^{n_l}\phi(x_{lk})\right]\left[\phi(x_{qj}) - \frac{1}{M}\sum_{h=1}^{N}\sum_{m=1}^{n_m}\phi(x_{hm})\right]$$

$$(\tilde{k}_{ij})_{pq} = (k_{ij})_{pq} - \frac{1}{M}\sum_{l=1}^{N}\sum_{k=1}^{n_l}(1_{ik})_{pl}(k_{kj})_{lq} - \frac{1}{M}\sum_{h=1}^{N}\sum_{m=1}^{n_m}(k_{im})_{ph}(1_{mj})_{hq} + \frac{1}{M^2}\sum_{l=1}^{N}\sum_{k=1}^{n_l}\sum_{h=1}^{N}\sum_{m=1}^{n_m}(1_{ik})_{pl}(k_{km})_{lk}(1_{mj})_{hq}$$

$$\tilde{K}_{pq} = K_{pq} - \frac{1}{M}\sum_{l=1}^{N}1_{pl}K_{lq} - \sum_{h=1}^{N}K_{ph}1_{hq} + \frac{1}{M^2}\sum_{l=1}^{N}\sum_{h=1}^{N}1_{pl}K_{lh}1_{hq}$$

$$\tilde{K} = K - \frac{1}{M}1_N K - \frac{1}{M}K1_N + \frac{1}{M^2}1_N K 1_N$$

Where we have introduced the following matrix:
$1_{pl} = (1_{ik})_{i=1,\ldots,n_p;\ k=1,\ldots,n_l}$, $(n_p \times n_l)$ matrix whose elements are all equal to 1.
$1_N = (1_{pl})_{p=1,\ldots,N;\ l=1,\ldots,N}$, $(M \times M)$ matrix whose elements are block matrices.

Thus, for non-centred points $\phi(x_{ij})$, we can derive $\vec{K}$ from K and then solve for the eigenvectors of $\vec{K}$. Then, for a feature vector x, the projection of the centred $\phi$-image of x onto the eigenvectors $\vec{v}$ is given by:

$$(\tilde{\phi}'(x)v) = \sum_{p=1}^{N}\sum_{q=1}^{n_p}\tilde{\alpha}_{pq}\tilde{\phi}'(x_{pq})\tilde{\phi}(x)$$

The above discussion sets out in general terms the method of general discriminant analysis. The general principles will now be illustrated with reference to the specific example of the coin validator.

Returning to the example of the coin validator at the beginning of the description, the feature vectors each have three elements, and there are three clusters, corresponding to each of the two denominations of interest and the known counterfeit respectively.

50 samples of each denomination and 50 samples of the counterfeit are input to the measuring system 1. As previously mentioned, the sensor systems measures samples to obtain values representative of the thickness, material and diameter in each case. Corresponding feature vectors are formed from the measured features for each sample.

From the 50 samples feature vectors for each cluster, 37 are randomly selected for use in generating the separating function.

A kernel function is then chosen. The kernel function is chosen on the basis of trial and error so as to choose whichever function gives the best separation results. There are a large number of kernel functions, satisfying Mercer's theorem, which may be suitable. Examples of kernel functions are the polynominal kernel:
$k(x, y) = (x \cdot y)^d$;

the Gaussian kernel:

$$k(x, y) = \exp\frac{(\|x-y\|^2)}{\sigma^2};$$

the hyberbolic tangent kernel:

$k(x,y) = \tan h((x.y) + \theta)$; and the sigmoid kernel:

$$k(x, y) = \left(\frac{1}{1 + e^{-((x,y)+\theta)}}\right).$$

In this example, the Gaussian kernel is used, with a $\sigma^2 = 0.01$.

Using the selected samples and the kernel function, the matrices K and W are calculated. (Equations (8) and (9)).
Then K is decomposed using QR decomposition.
Then eigenvectors $\beta$ and corresponding eigenvectors are calculated (equation (18)).
Then coefficients $\alpha$ are calculated and normalised (equations (16) and (20)).
Thereafter, the feature vectors of the remaining 13 samples for each cluster are projected onto the eigenvectors v (equation 21) and the results are plotted on a graph for easy inspection. In this example, there are 3 clusters, so there are 2 eigenvectors, and separation is in 2-d space. This is shown in FIG. 3. As can be seen, the clusters are well-separated. More specifically, each cluster is projected on one point, which is the gravity centre. The separation of the projection of the clusters with the eigenvectors is then analysed, and used to derive a separation function. In this example, a linear separating function can easily be derived by inspection. For example, a suitable separating function is:
for eigenvectors $v_1$, $v_2$
and an input vector x
If $[(\phi'(x)v_1) > 0$ and $(\phi'(x)v_2) > 0]$ then
x belongs to group 1 (that is, it is of the first denomination);
if $[(\phi'(x)v_1) > 0$ and $(\phi'(x)v_2) < 0]$
then x belongs to group 2 (that is, it is of the second denomination); and
if $[(\phi'(x)v_1) < 0$ and $(\phi'(x)v_2) > 0]$
then x belongs to group 3 (that is, it is a counterfeit of the first denomination).
Classification for coins of an unknown denomination is then performed as follows. The inserted coin is sensed, and measurements representative of the material, thickness and diameter are obtained, as for the samples. A feature vector is then derived from the measured values. The feature vector is then projected onto the calculated eigenvectors (using equation 21) and the coin is classified in accordance with the projection values and the separating function, as described above.

The analysis of the sample values for the initial data analysis and the derivation of the separating function can be done, for example, using a microprocessor. Similarly, the classifier 6 may be a microprocessor.

As an alternative, the classifier 6 may be a neural network, such as a probabilistic neural network, or a perceptron. For example, the neural network may include N-1 linear output neurones and M hidden neurones, where every kernel computation is a hidden neurone. Then the input weights are the values $x_{pq}$, and the coefficients $\alpha$ are the weights between the hidden neurones and the output layer.

Also, the classifier may be a linear classifier, or a Support Vector Machine.

The methods of the embodiment described above are equally applicable to a banknote or indeed to a classification of other sorts of items. Other methods of solving (10), for example by decomposing K using eigenvector decomposition, are possible.

In the embodiment, a non-linear mapping to a higher-dimensional space is used. A linear mapping could be used instead. Also, mapping could be to a lower-dimensional space, or to a space of the same dimension as the feature vector space.

What is claimed is:

1. A method of processing data derived from currency items, the method comprising:
   measuring samples of currency items of classes to produce feature vectors in a first space; and
   mapping the feature vectors to a second space in which there is a clearer separation of the classes than in the first space.

2. A method as claimed in claim 1 wherein the second space is determined using PCA or LDA.

3. A method as claimed in claim 2 wherein data in the first space is mapped to a third space using a non-linear mapping, and PCA or LDA is performed on the image of the data in the third space.

4. A method as claimed in claim 1 further comprising deriving a separating function separating the classes.

5. A method of classifying an item of currency comprising measuring the currency item to derive a feature vector and determining the class of the currency item using the result of a method as claimed in claim 1.

6. A method of programming a currency validator comprising:
   performing a method according to claim 1 using a plurality of samples of currency items; and
   using a result from said performing to program the validator.

7. An apparatus for classifying items of currency comprising sensors to sense features of a currency item, a processor to generate a feature vector from the sensed values and a classifier to classify currency items using a result of a method as claimed in claim 1.

8. An apparatus for classifying items of currency comprising a classifier to process feature vector data derived from currency items wherein the classification is equivalent to processing the input data, which is in a first space, in a second space where there is clearer separation of the classes than in the first space.

9. An apparatus as claimed in claim 8 wherein the second space is determined using PDA or LDA.

10. An apparatus as claimed in claim 8 wherein the second space is determined using PDA or LDA, in the image of the input space under a non-linear mapping.

* * * * *

UNITED STATES PATENT AND TRADEMARK OFFICE
CERTIFICATE OF CORRECTION

PATENT NO. : 7,073,652 B2 Page 1 of 1
APPLICATION NO. : 10/444392
DATED : July 11, 2006
INVENTOR(S) : Gaston Baudat It is certified that error appears in the above-identified patent and that said Letters Patent is hereby corrected as shown below:

Title Page
(56) References Cited, Other Publications
In the Tanaka et al. reference, "XP01286775" should be --XP0102867775--;
In the Lanitis et al. reference, "Lantis" should be --Lanitis--;
    after "Cypriot" insert --Coinage--.

Signed and Sealed this

Thirtieth Day of October, 2007

JON W. DUDAS
*Director of the United States Patent and Trademark Office*